United States Patent [19]
Ohmori et al.

[11] Patent Number: 5,701,011
[45] Date of Patent: Dec. 23, 1997

[54] APPARATUS FOR PICKING UP IMAGE BY ELECTROMAGNETIC WAVE RAY

[75] Inventors: Koichi Ohmori, Toyonaka; Toshiyoshi Yamamoto, Sanda; Yuji Matsuda, Takatsuki; Yoshihiko Tanji, Osaka; Takayoshi Yuuzu, Ikama-gun, all of Japan

[73] Assignee: Matsushita Electric Industrial Co., Ltd., Osaka, Japan

[21] Appl. No.: 655,560

[22] Filed: May 30, 1996

[30] Foreign Application Priority Data

May 31, 1995 [JP] Japan ................... 7-133316

[51] Int. Cl.$^6$ .................. H01L 27/148; H01L 31/0224
[52] U.S. Cl. ................................. 250/370.09
[58] Field of Search ........................... 250/370.09

[56] References Cited

U.S. PATENT DOCUMENTS

| | | |
|---|---|---|
| 3,939,555 | 2/1976 | Jantsch et al. . |
| 5,132,542 | 7/1992 | Bassalleck et al. ............. 250/370.09 |
| 5,245,191 | 9/1993 | Barber et al. . |

FOREIGN PATENT DOCUMENTS

| | | |
|---|---|---|
| 0 161 324 | 11/1985 | European Pat. Off. . |
| 5-93780 | 4/1993 | Japan . |
| WO 92/14169 | 8/1992 | WIPO . |

OTHER PUBLICATIONS

European Search Report 96303789.0, dated Sep. 30, 1996.

*Primary Examiner*—Constantine Hannaher
*Attorney, Agent, or Firm*—Ratner & Prestia

[57] ABSTRACT

A radiographic apparatus is provided which is capable of converting an X-ray directly into an electric signal, high in resolution and detection efficiency, and easy to manufacture. On at least one surface of a compound semiconductor substrate for generating an electric charge by X-ray irradiation, a plurality of split electrodes are disposed, and electrodes are disposed on picture elements formed on a CCD corresponding to these split electrodes, and are electrically connected to CdTe as compound semiconductor substrate and the CCD. An electric current issued from the split electrodes is divided, and is partly discharged through grounding wires.

7 Claims, 3 Drawing Sheets

APPARATUS FOR PICKING UP IMAGE BY ELECTROMAGNETIC WAVE RAY

BACKGROUND OF THE INVENTION

1. Industrial Field of Utilization

The present invention relates to an apparatus for picking up an image by irradiation with an electromagnetic wave ray used in medical treatment, and more particularly to a radiographic apparatus used in dental treatment.

2. Description of Prior Art

Imaging of transmission X-ray pictures of the human body has been widely used as an examination method in medical and dental fields.

For example, oral cavity radiography for teeth in dentistry has been performed by placing an X-ray generation unit outside the oral cavity, holding a film to the back side of the teeth in the oral cavity with a fingertip, emitting X-rays from the X-ray generation unit, and sensitizing the film by the X-rays transmitted through the objective teeth. In this process, a radiograph of teeth is taken.

A panoramic radiograph of teeth has been taken in a film by emitting a slit of X-rays while rotating the X-ray source around the patient with the film fixed synchronously along with movement of the X-ray source.

In radiography by film, however, it takes time for film development, fixing, and washing in water after emitting X-rays, and storage and control of films is not easy. Besides, since the sensitivity of X-ray films is low, it requires a long exposure time. Therefore, blurring is likely to be caused due to movement of the fingers when taking teeth in the oral cavity or movement of the head in panoramic radiography, and unclear radiographs are taken, and adverse effects in diagnosis are noted.

When using a solid state image for converting an X-ray directly into an electric signal, instead of the X-ray film, the taken image can be stored as an electric signal, and hence storage and control may be easy. For example, a solid state imager for radiography by applying a scintillator on the entire surface of the reception side of a charge-coupled device (CCD) has been proposed. A defect of this solid state imager is that the resolution is lowered by crosstalk of the scintillator. Besides, to enhance the X-ray detection efficiency, it is necessary to increase the thickness of the scintillator. However, as the scintillator becomes thicker, the crosstalk increases, and the resolution declines. Therefore, the thickness of the scintillator is limited, and it is difficult to enhance the detection efficiency.

To overcome this deficiency, a structure having a scintillator divided for each picture element of a CCD is proposed in Japanese Laid-open Patent 5-93780. The example disclosed in Japanese Laid-open Patent 5-93780 is described below while referring to FIG. 3. FIG. 3 shows a structure of a conventional solid state imager for radiography. In FIG. 3, a convex pattern is formed on every picture element of a solid state imager 30 on the surface of a substrate 200. Columnar crystals 31 of a scintillator are grown on the convex pattern. That is, the columnar crystals 31 of a scintillator are divided for each picture element of the solid state imager 30.

In such a structure, since the scintillator is divided for each picture element of the solid stage imager 30, crosstalk is less, but a new crystal growth process is required in manufacturing, and the process is complicated. Or, instead of the crystal growth process, it may be considered to adhere the scintillatot crystals to one surface, and then divide by cutting according to the picture elements of the solid state imager. In this process, however, it is difficult to reduce the size of picture element in the manufacturing process, and the resolution cannot be enhanced.

On the other hand, a solid state imager forming CdTe or GaAs on the CCD has been considered. Such an example is proposed in Japanese Patent Publication 6-505800. This published example is explained below while referring to FIG. 4. In FIG. 4, a CdTe 41 is divided and formed on each picture element of a CCD 40. In this example, the electric charge caused in the CdTe 41 by the input of an X-ray is converted in the CCD 40, and is counted in a threshold counter 43 through a linear amplifier 42. In this example, too, since the CdTe 41 is divided, it is hard to enhance the resolution by reducing the size of each picture element in the manufacturing process.

To solve the problems of the prior art, it is hence a primary goal of the invention to present an electromagnetic wave ray image pickup apparatus which is capable of converting directly into electric charge (or electric signal) by emitting electromagnetic wave ray, possesses a high resolution and an excellent detection efficiency, and is easy to manufacture.

SUMMARY OF THE INVENTION

The apparatus for picking up an image by electromagnetic wave rays of the invention is composed of a compound semiconductor substrate for generating an electric charge by emitting electromagnetic wave rays such as X-ray, gamma-ray and other radiation, and a charge-coupled device (CCD) for converting the electric charge generated by the compound semiconductor substrate into a video signal. The CCD possesses a plurality of picture elements. A split electrode divided into a plurality is disposed on at least one surface of the compound semiconductor substrate. Each electrode is disposed on each picture element of the CCD at the position corresponding to the split electrode.

In this structure, it is particularly preferred to compose so as to divide the electric charge issued from the split electrode, and discharge part of the divided electric charge.

Another apparatus for picking up an image by electromagnetic wave rays of the invention is composed of a compound semiconductor substrate for generating an electric signal (or electric charge) by emitting electromagnetic wave rays such as X-ray, gamma-ray and other radiation, a CCD for converting the electric signal generated by the compound semiconductor substrate into a video signal, and an image processor for processing the video signal received from the CCD. A plurality of memories and an operation element are provided in the image processor. The video signal from the CCD is divided and stored in the plurality of memories. The divided video signals are added by the operation element and issued.

According to this structure, by disposing a plurality of division electrodes on the compound semiconductor substrate, the picture elements are electrically separated from each other. Therefore, the electric charge (or electric signal) generated in the compound semiconductor substrate by the input of X-ray, gamma-ray or other radiation is collected only in the picture element corresponding to the incident position. Hence, the generated electric charge (or electric signal) is not distributed into surrounding picture elements. As a result, the crosstalk is suppressed.

The split electrodes can be formed easily by using a general light exposure process, and small picture element size and picture element pitch can be manufactured easily, so that the resolution of the picture may be enhanced.

Moreover, since the picture elements are electrically separated from each other, by increasing the thickness of the compound semiconductor substrate, the detection efficiency of X-ray or radiation can be enhanced without increasing the crosstalk.

Hence, the electromagnetic wave ray image pickup apparatus characterized by no crosstalk, small picture elements, high resolution, and high detection efficiency can be obtained.

Figure 1:
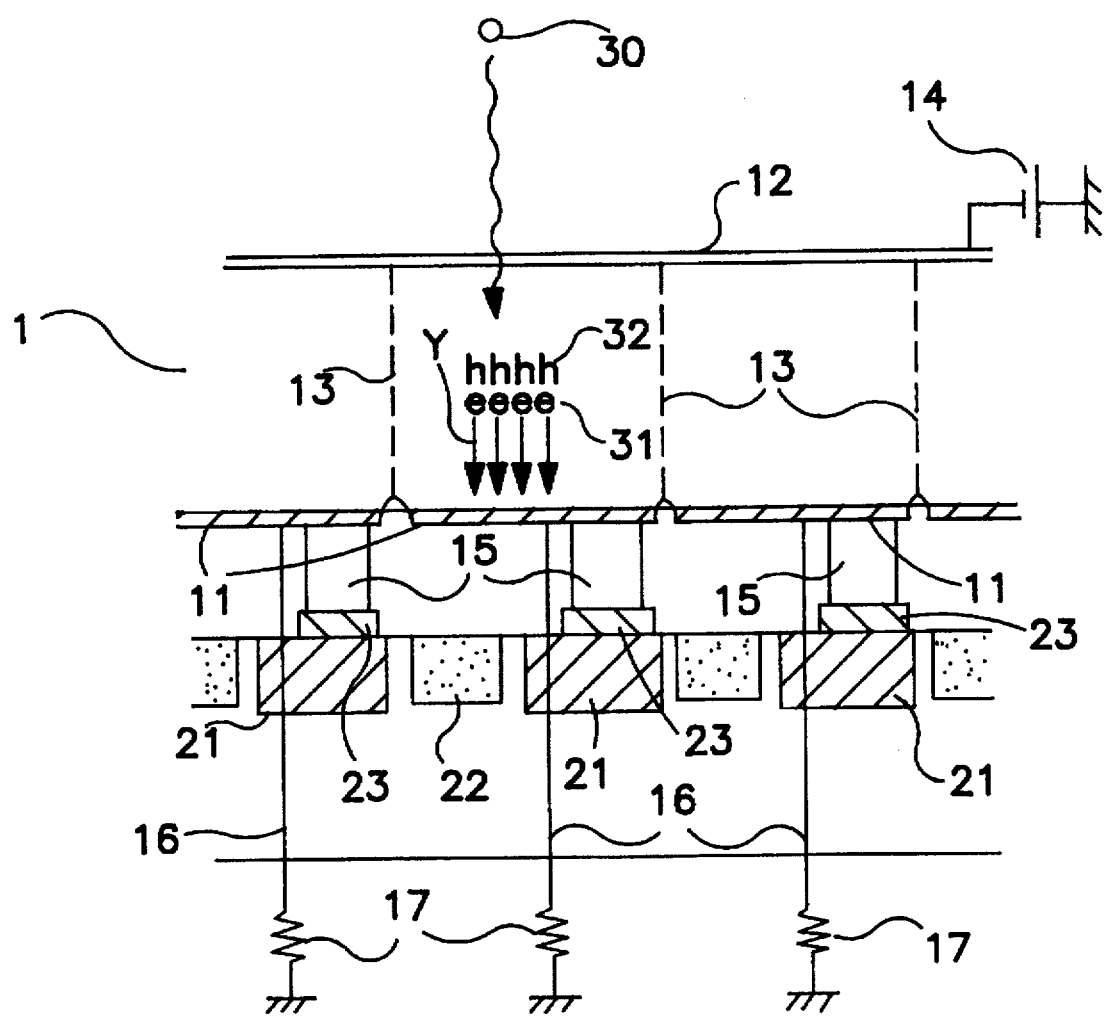
FIG. 1 is a structural diagram of an embodiment of electromagnetic wave ray image pickup apparatus of the invention.

| Reference Numerals |
| --- |
| 1 Compound semiconductor substrate |
| 2 CCD |
| 3 Amplifier |
| 4 Image processor |
| 5 Image display unit |
| 11 Split electrode |
| 12 Common electrode |
| 13 Boundary of line of electric force |
| 14 Voltage |
| 15 Bump |
| 16 Grounding wire |
| 17 Resistance |
| 21 Diffusion layer |
| 22 Transfer unit |
| 23 Electrode |
| 30 X-ray |
| 31 Electron |
| 32 Hole |
| 100 Switch |
| 101 Memory |
| 102 Operation element |
| Y Electron moving direction |

DESCRIPTION OF THE PREFERRED EMBODIMENTS

Embodiments of an apparatus for picking up an image by an electromagnetic wave ray of the invention are described.

Embodiment 1

FIG. 1 is a structural diagram of an embodiment of an apparatus for picking up an image by electromagnetic wave rays of the invention. In FIG. 1, a plurality of split electrodes 11 are divided at a specific pitch and disposed on a first plane of a compound semiconductor substrate 1, and a common electrode 12 is placed on a second plane of the compound semiconductor substrate 1. Bumps 15 are formed on the surface of the split electrodes 11.

On the other hand, a CCD 2 includes a plurality of diffusion layers 21 formed at a specific pitch, and a plurality of transfer units 22. The pitch of the split electrodes 11 is the same as the pitch of the diffusion layers 21 and transfer units 22. Electrodes 23 are disposed on the surface of the diffusion layers 21. The electrodes 23 and bumps 15 are electrically connected with each other. Grounding wires 16 are connected to the split electrodes 11. Resistance elements 17 are connected to the grounding wires 16. A voltage 14 is applied to the common electrode 12.

In the electromagnetic wave ray image pickup apparatus thus constituted, the operation is described below. When a voltage 14 is applied between each split electrode 11 and common electrode 12, a boundary 13 of line of electric force is created between the split electrodes 11, and the compound semiconductor substrate 1 is electrically divided. That is, the CCD 2 has a plurality of picture elements corresponding to the regions divided by the line of electric force 13.

When an X-ray 30, a type of electromagnetic wave ray, enters the compound semiconductor substrate, electrons 31 and 32 are formed in the compound semiconductor substrate 1. By the electric field, the electrons 31 move toward the split electrodes 11 as indicated by arrow Y, and are collected in the split electrodes 11. At this time, since the split electrodes 11 are separated from each other by the line of electric force 13, the electrons 31 will not flow into an adjacent split electrode 11. Part of the electrons 31 collected in the split electrodes 11 gets into the diffusion layers 21 of the CCD 2 through the bumps 15 and electrodes 23 on the diffusion layers 21 of the CCD 2. In the CCD 2, the electrons 31 getting into the diffusion layers 21 are moved to the transfer units 22. The electrons 31 getting into the transfer units 22 are transferred, and issued as video signals. On the other hand, the other electrons 31 collected in the split electrodes 11 are grounded through the grounding wires 16 and resistance elements 17.

The material of the compound semiconductor substrate 1 is not limited particularly, but CdTe, GaAs, $HgI_2$, and $Pb_2S$ are used.

In this constitution, since the compound semiconductor substrate 1 is electrically divided into picture elements, there is almost no crosstalk among picture elements. Moreover, the crosstalk does not increase in other embodiments in which the thickness of the compound semiconductor substrate is increased in order to raise the X-ray detection efficiency. Yet, since the picture elements are mutually isolated electrically only by the formation of split electrodes, it is not necessary to cut and divide the individual picture elements mechanically. Therefore, by reducing the picture element size, the resolution is enhanced. In addition, since the video signal is issued from the CCD 2 as an electric signal, the video signal can be easily stored in a memory medium such as a magneto-optical disk. It is hence easy to store and control the taken images. Furthermore, since the compound semiconductor substrate 1 is higher in X-ray detection efficiency than in the film, the exposure time can be shortened as compared with the conventional film.

The effective energy of an X-ray 30 is more than 30 keV in the medical diagnosis region. On the other hand, in the compound semiconductor substrate 1, the number of electrons generated by the input of X-ray 30 is theoretically in the order of about 1000 at effective energy per X-ray photon. Generally, the capacity of the transfer units 22 of the CCD 2 is limited. Therefore, if all the electrons generated in the compound semiconductor substrate 1 are moved to the transfer units 22, transfer units 22 may be saturated by an input of a small amount of X-ray photons. Therefore, the upper limit of the number of incident X-ray photons is limited, and the dynamic range may be narrower. In the radiographic apparatus of the embodiment, since part of the electrons 31 generated in the compound semiconductor substrate 1 is discharged through the grounding wires 16, the number of electrons per X-ray photon getting into the transfer units 22 may be suppressed. Therefore, the upper limit of the number of incident X-ray photons can be increased, so that the dynamic range can be extended.

This embodiment is constituted to discharge part of the electrons 31 divided by the split electrodes 11 and generated in the compound semiconductor substrate 1 through the grounding wires 16. It is also possible to restrict the number of electrons getting into the transfer units 22, such as the constitution of dividing the electrons 31 by the diffusion layers 21. Instead of the X-rays, it is also possible to use gamma-ray, radiation, and other electromagnetic wave rays.

Embodiment 2

Figure 2:
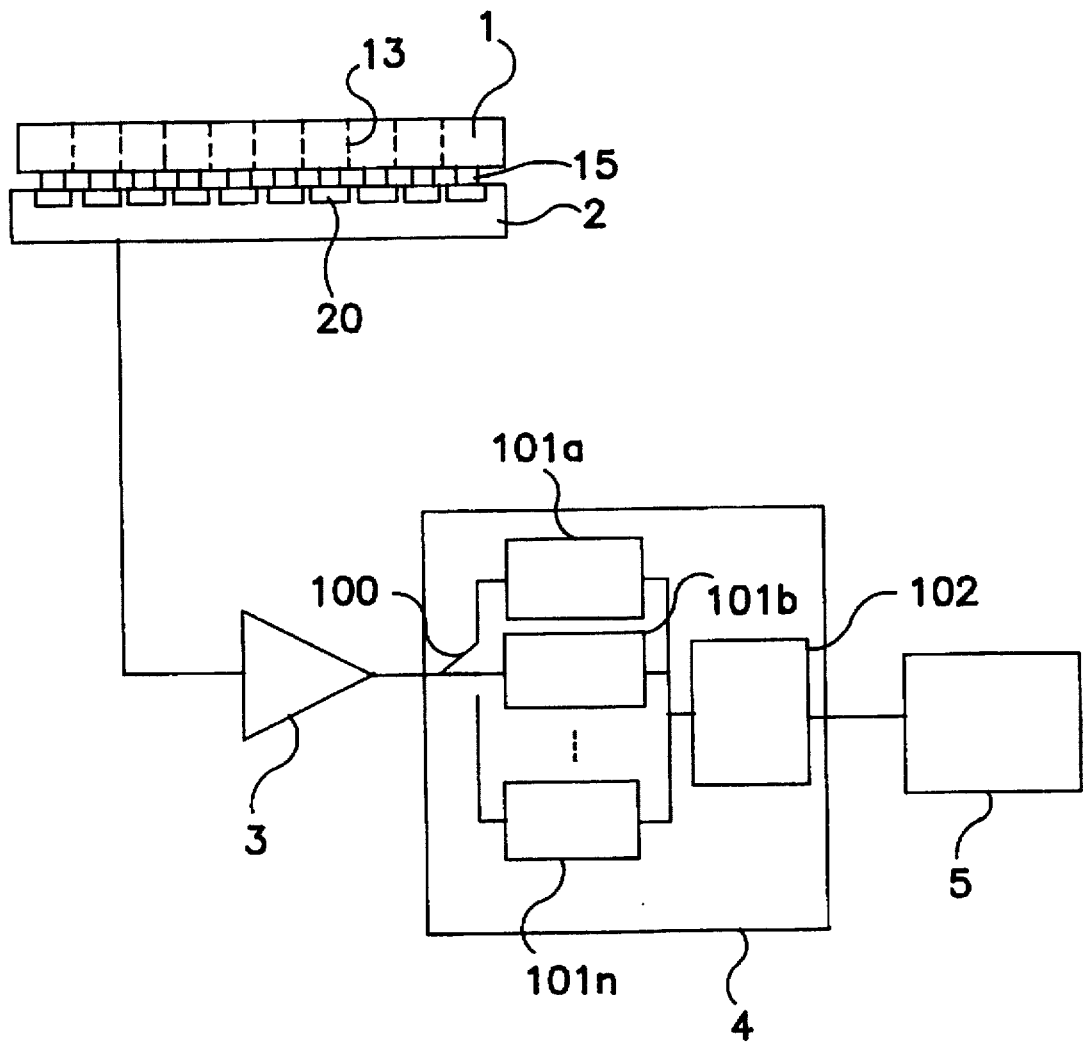
FIG. 2 is a structural diagram of another embodiment of electromagnetic wave ray image pickup apparatus of the invention.
Figure 3:
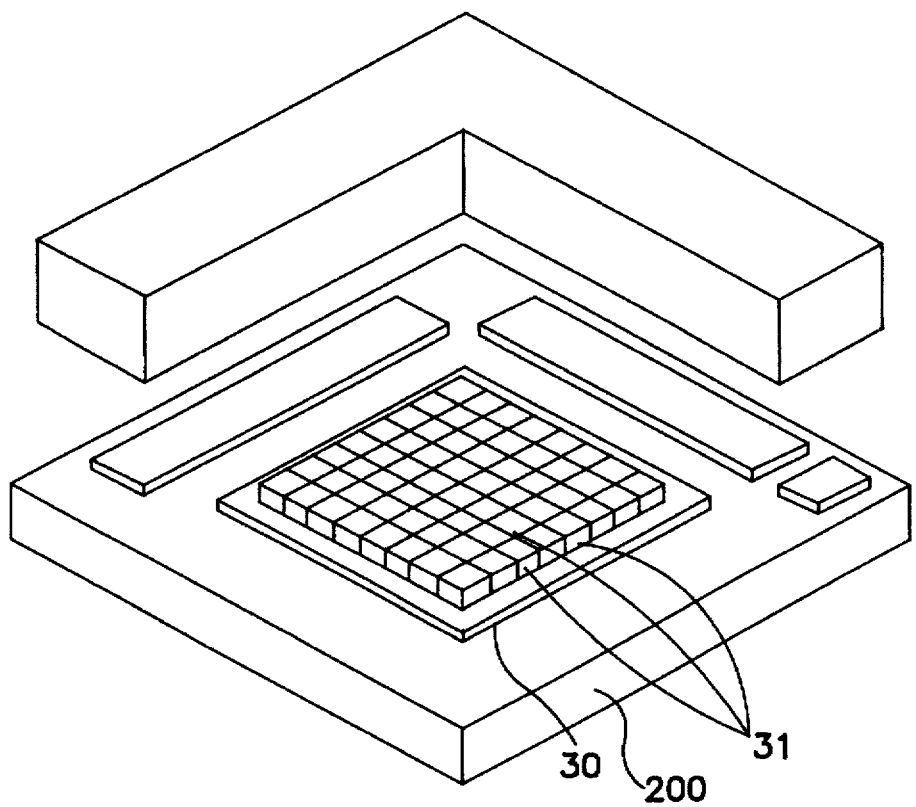
FIG. 3 is a structural diagram of a conventional radiographic apparatus.
Figure 4:
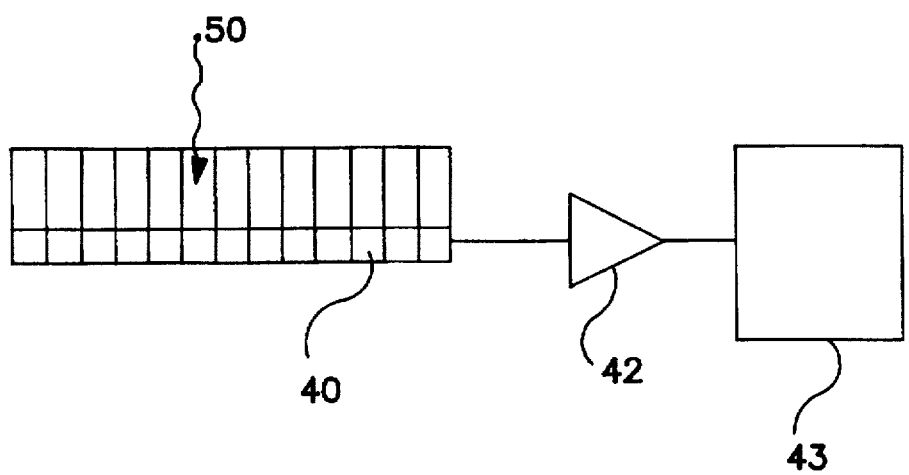
FIG. 4 is a structural diagram of another conventional radiographic apparatus.

FIG. 2 is a structural diagram of another embodiment of an apparatus for picking up an image by an electromagnetic wave ray of the invention. In FIG. 2, a CCD 2 has a plurality of picture elements 20. A compound semiconductor substrate 1 has, as in embodiment 1, a plurality of split electrodes disposed on a first plane and a common electrode disposed on a second plane. Each bump 15 is disposed on the surface of each split electrode. Each picture element of a plurality of picture elements 20 is electrically connected to the each bump 15. The CCD 2 is electrically connected sequentially to an amplifier 3, an image processor 4, and an image display 5. The image processor 4 comprises a switch 100, a plurality of memories 101a, 101b, ... 101n, and an operation element 102.

In the electromagnetic wave ray image pickup apparatus of the invention thus constituted, the operation is described below. The compound semiconductor substrate 1 is structured the same as in embodiment 1, and the explanation of the onset mechanism of electric charge (electric signal) by input of an X-ray and its action is omitted. The compound semiconductor substrate 1 is electrically separated in each picture element by the line of electric force 13, as in embodiment 1. In this embodiment, the output of the compound semiconductor substrate 1 is not divided. That is, the electrons generated in the compound semiconductor substrate 15, and are fed intbumps 15, and are fed into the picture elements 20 of the CCD 2, and issued as video signal. The video signal is amplified by the amplifier 3 and is provided to the image processor 4. The switch 100 is provided in the image processor 4. By changing over the switch 100, the video signal is divided and stored in memory 101a to memory 101n.

In the operation element 102, the divided video signals in memory 101 a to memory 101 n are added by the operation element 102, and an image is displayed in the image display 5. As mentioned in embodiment 1, there is a risk of saturation of the picture elements 20 of the CCD 2 depending on the X-ray exposure dose. In this embodiment, the reading period of the CCD 2 is set so as to be divided in time intervals so that the picture elements 20 may not be saturated. That is, by the switch 100, for example, a signal of a first period is divided and stored in the memory 101a, a signal of a second period in the memory 101b, and a signal of an n-th period in the memory 101n. Afterwards, the operation unit 102 processes by adding. By thus dividing in time and storing, the X-ray image can be displayed in a wider dynamic range without decreasing the information quantity of the X-ray.

In this constitution, there is almost no crosstalk between picture elements. Even in an embodiment with increased thickness of the compound semiconductor substrate 1 to raise the X-ray detection efficiency, the crosstalk is not increased. Besides, as in embodiment 1, the size of picture element can be reduced, and hence the resolution can be enhanced. Moreover, since the video signal is issued as an electric signal from the CCD 2, the video signal can be easily stored in a memory medium such as a magneto-optical disk. It is therefore easy to store and control the taken images. Furthermore, compared with the conventional film, the exposure time can be shortened.

In this embodiment, meanwhile, processing in the operation unit 102 is designed to process by adding, which may be replaced, however, by image processing means such as addition average.

In embodiments 1 and 2, for the compound semiconductor substrate, CdTe, GaAs, HgI2, or Pb2S was used, but it may be also replaced by another compound semiconductor substrate having a larger effective atomic number and higher X-ray absorption efficiency characteristic. The shape of the compound semiconductor substrate and CCD is not limited to the shown examples, but other arbitrary shapes may be also realized.

In this way, by disposing split electrodes divided in a plurality in the compound semiconductor substrate, the picture elements are electrically separated into the individual picture element. Hence, the crosstalk is suppressed. Moreover, by increasing the thickness of the compound semiconductor substrate, the detection efficiency of X-ray, gamma-ray or other radiation may be enhanced without increasing the crosstalk. Moreover, since the split electrode can be easily formed in a photo exposure process, each picture element size of the plurality of picture elements can be reduced, so that the resolution may be heightened. Thus, an electromagnetic wave ray image pickup apparatus having no crosstalk, high resolution, and high detection efficiency is obtained.

By dividing the electric charges issued from the split electrodes and discharging part of the electric charges, a wide dynamic range can be realized. Yet, by furnishing the image processor with a plurality of memories and an operation unit, and dividing the video signal from the CCD and storing in a plurality of memories, and outputting by adding by means of the operation unit, a wide dynamic range is realized while preventing saturation of CCD.

Therefore, the exposure time by irradiation with electromagnetic wave rays such as X-rays can be shortened, and blurring of image due to move of the patient may be decreased, so that a clear X-ray picture may be taken. Moreover, since the video signal from the CCD is issued as electric signal, it can be easily stored in a memory medium such as magneto-optical disk. Therefore, the taken pictures can be stored and controlled easily.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An apparatus for picking up an image using electromagnetic wave rays of comprising:

a compound semiconductor substrate for generating an electric charge by irradiation with electromagnetic wave rays, a charge-coupled device (CCD) for converting the electric charge into a video signal, said CCD having a plurality of picture elements, a plurality of split electrodes disposed on at least one surface of the compound semiconductor substrate, each split electrode being separated from each other, a grounding wire disposed in each split electrode, and a plurality of electrodes, each electrode being disposed on each surface of each picture element, wherein each split electrode and each electrode are electrically connected with each other, the electric charge generated in the compound semiconductor substrate is collected in each split electrode, the electric charge collected in each split electrode is provided to each picture element, and part of the electric charge collected in each split electrode is discharged through the grounding wire.

2. An apparatus for picking up an image using electromagnetic wave rays of claim 1, wherein each split electrode and each picture element are disposed at mutually corresponding positions.

3. An apparatus for picking up an image using electromagnetic wave rays of claim 1, wherein the compound semiconductor substrate is made of at least one material selected from a group consisting of CdTe, GaAs, $HgI_2$, and $Pb_2S$.

4. An apparatus for picking up an image using electromagnetic wave rays comprising:

a compound semiconductor for generating an electric charge by irradiation with electromagnetic wave rays, a CCD for converting the electric charge into a video signal, said CCD having a plurality of picture elements, a plurality of split electrodes disposed on at least one surface of the compound semiconductor, each split electrode being separated from each other, a grounding wire disposed in each split electrode, and an image processing means for processing an image of the video signal, wherein the image processing means has a plurality of memory elements and an operation element, the plurality of memory elements divide the video signal from the CCD for storage in the plurality of memory elements, the operation element processes the divided video signals by at least one of addition and addition average, and part of the electric charge collected in each split electrode is discharged through the grounding wire.

5. An apparatus for picking up an image using electromagnetic wave rays of claim 4, wherein the plurality of memory elements store the video signal from the CCD by dividing into time intervals.

6. An apparatus for picking up an image using electromagnetic wave rays of claim 4, wherein the compound semiconductor is made of at least one material selected from a group consisting of CdTe, GaAs, $HgI_2$, and $Pb_2S$.

7. An apparatus for picking up an image using electromagnetic wave rays comprising:

a compound semiconductor substrate for generating an electric charge by irradiation with electromagnetic wave rays, a CCD for converting the electric charge into a video signal, said CCD having a plurality of picture elements, an image processing means for processing the image of the video signal, said image processing means having a plurality of memory elements and an operation element, a plurality of split electrodes disposed on at least one surface of the compound semiconductor substrate, each split electrode being separated from each other, a grounding wire disposed in each split electrode, and a plurality of electrodes, each electrode being disposed on each surface of each picture element, wherein each split electrode and each electrode are electrically connected with each other, the electric charge generated in the compound semiconductor substrate is collected in each split electrode, the electric charge collected in each split electrode gets into each picture element, part of the electrode charge collected in each split electrode is discharged through the grounding wire, the plurality of memory elements divide the video signal from the CCD for storage in the plurality of memory elements, and the operation element processes the divided video signals by at least one of addition and addition average.

* * * * *

UNITED STATES PATENT AND TRADE MARK OFFICE
CERTIFICATE OF CORRECTION

PATENT NO.   : 5,701,011
DATED        : December 23, 1997
INVENTOR(S)  : Ohmori et al.

It is certified that error appears in the above-identified patent and that said Letters Patent is hereby corrected as shown below:

On the cover page, item [75] Inventors, "Ikama-gun" should be ---IKoma---

Column 6, line 58, delete "of".

Signed and Sealed this

Eleventh Day of August 1998

Attest:

BRUCE LEHMAN

*Attesting Officer*    *Commissioner of Patents and Trademarks*